United States Patent [19]
Chatufale

[11] Patent Number: 6,050,541
[45] Date of Patent: Apr. 18, 2000

[54] PNEUMATIC VALVE ACTUATOR ASSEMBLY

[76] Inventor: Vijay R. Chatufale, 10950 W. Brae Pkwy.#2112, Houston, Tex. 77031

[21] Appl. No.: 09/094,992

[22] Filed: Jun. 15, 1998

[51] Int. Cl.[7] .................................................. F16K 31/363
[52] U.S. Cl. ........................... 251/63.6; 137/315; 92/128; 251/63.5
[58] Field of Search ................................ 251/63.6, 63.5, 251/62, 63; 137/315; 92/128

[56] References Cited

U.S. PATENT DOCUMENTS

| | | |
|---|---|---|
| Re. 29,322 | 7/1977 | Nelson . |
| 3,993,284 | 11/1976 | Lukens, Jr. . |
| 4,135,546 | 1/1979 | Morrison . |
| 4,871,143 | 10/1989 | Baker . |
| 5,632,466 | 5/1997 | Ochs ................................. 251/63.6 X |

OTHER PUBLICATIONS

Cameron Advertisement p. 1732 from *Composite Catalog of Oil Field Equipment and Services*, '95, published by World Oil, Gulf Publishing Co., P.O. Box 2608, Houston, TX.

*Primary Examiner*—Kevin Lee
*Attorney, Agent, or Firm*—Kenneth L. Nash

[57] ABSTRACT

A pneumatic actuator and method for a gate valve are disclosed which provide for stepped guide connections between upper and lower cylinder plates for a pneumatic cylinder to thereby automatically centralize and locate the relatively heavy pneumatic cylinder and upper/lower plates with respect to each other to increase the speed and ease of the assembly of the pneumatic actuator. Each major metallic sliding component of the actuator is mounted on a wear ring that prevents metal-to-metal contact to thereby prevent friction wear and galling. A wear ring is provided in the operator stem packing assembly that provides for more reliable sealing due to lack of wear on the operator stem in the region of the stem packing wherein the operator stem reciprocates. A smaller diameter spring housing is provided to house that portion of the spring assembly that extends beyond the stroke of the piston to reduce cost of the larger diameter pneumatic cylinder. A slip joint is provided between the driving stem and operating stem to permit removal/assembly of the actuator components at bolted connections between the upper cylinder plate, pneumatic cylinder, and the lower cylinder plate as well as between the spring housing and the bonnet. This assembly permits the most direct access to any seal or packing to reduce maintenance time. The diameter of the pneumatic actuator is preferably in the range of about twenty inches to allow a single size actuator that operates on virtually any normally available site pressure. The construction permits interchangeableness of components to reduce manufacturing costs when variations in size of certain components are made to conform to particular specifications. The actuator is designed so that it can be constructed and assembled entirely separately from the gate valve to thereby allow reduced manufacturing costs due to manufacturing scheduling flexibility.

27 Claims, 1 Drawing Sheet

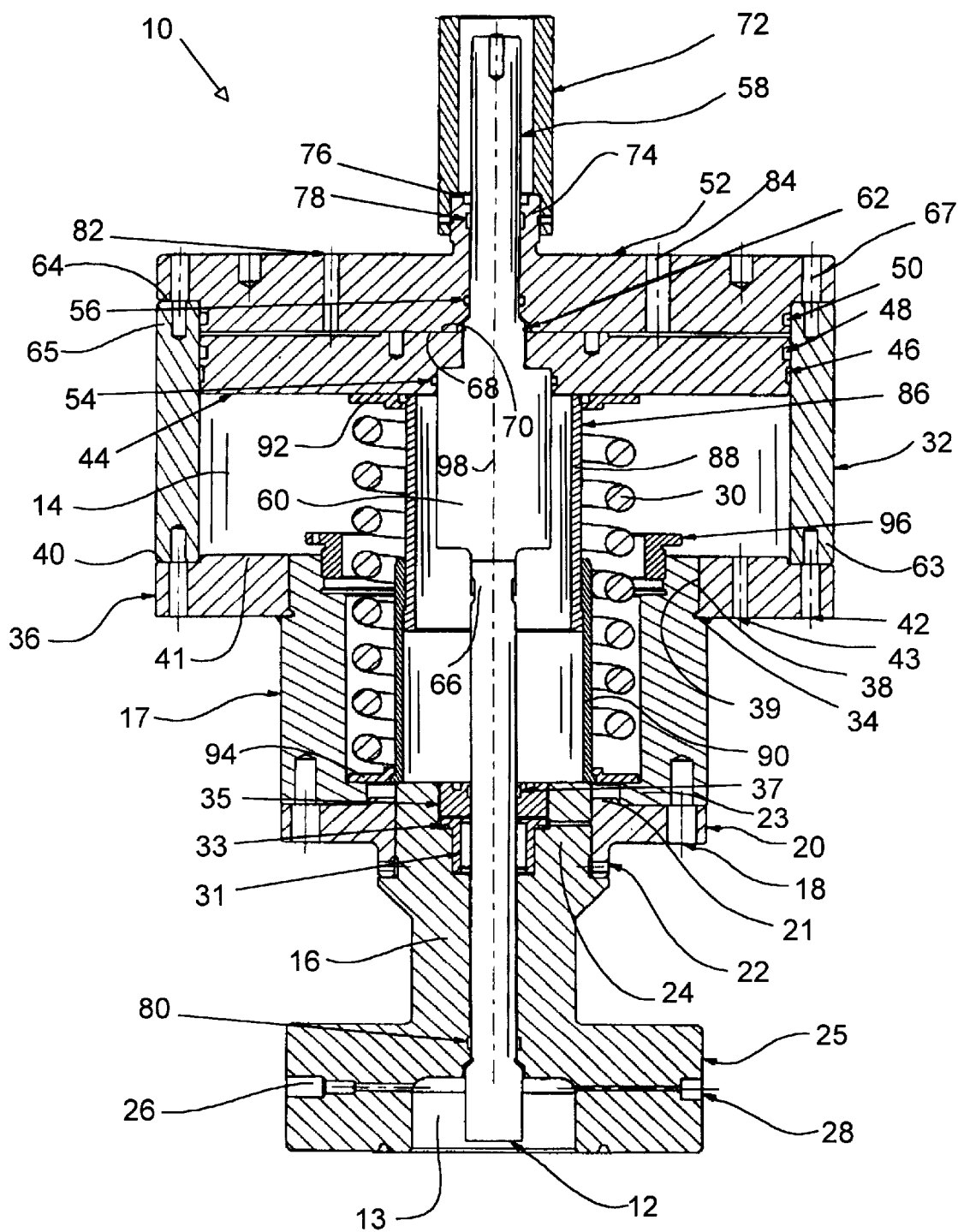

PNEUMATIC VALVE ACTUATOR ASSEMBLY

BACKGROUND OF THE INVENTION

1. Field of the Invention

The present invention relates generally to valve actuators and, more particularly, to apparatus and methods for pneumatically operated surface gate valve actuators.

2. Description of the Background

Pneumatic actuators are often used as a fail-safe device that responds to a low pressure in a gas supply, such as might occur due to a rupture or other failure whereupon the actuator returns the gate valve to a safe position. Conventional pneumatic actuators often have numerous problems that increase the cost of manufacturing, decrease the reliability, and make maintenance more time consuming and difficult. In many devices, it is difficult for workmen to align the various components during assembly so that considerable time is required for both assembly and disassembly. Since pneumatic actuators are relatively large and heavy and may range from about two feet to about four feet in length and weigh upwards of a thousand pounds or more, assembly and disassembly time problems can be significant cost factors. In many prior art devices, the actuator and gate valve design are designed as a single unit so that it is necessary to disassemble or assemble major portions of both actuator and gate valve for any maintenance as well as for manufacturing assembly purposes. In some cases, it is necessary to preload during assembly the return spring within the pneumatic actuator that provides the failsafe operation. This increases assembly time and also increases the time and equipment needed for disassembly. This construction can cause manufacturing delays and/or can greatly increase the time necessary for replacing, for instance, a single seal. The stem seals and/or piston seals can be very difficult to replace in some designs and may require replacing many additional seals that are functioning effectively, including metallic ring seals that are preferably left undisturbed when functioning properly. Often different size actuators require completely different sets of parts so that cost reductions due to component interchangeableness is lost. It is sometimes difficult to even match the various gas supply pressures typically available for operation to the type of actuators with the desired stroke for the pipe bore size.

Some previous attempts to overcome problems of pneumatic actuators such as the above and others are shown in the following representative patents for pneumatic actuators.

U.S. Pat. No. 4,135,546, issued Jan. 23, 1979, to B. L. Morrison, discloses an actuator with a packing assembly arranged between the gate valve stem and a bonnet secured to the valve body. An externally threaded packing sleeve is threaded within the bonnet and has the packing assembly removably connected thereto for movement with the sleeve.

U.S. Pat. No. 3,993,284, issued Nov. 23, 1977, to F. W. Lukens, Jr., discloses a mount for securing an actuator cylinder on a gate valve wherein the valve has a stem extending through a sleeve on the valve bonnet and the actuator cylinder has a collar mounted on the sleeve. A split ring is mounted in a groove in the outer end portion of the sleeve at the collar. A means mounted on the sleeve extends over the split ring to detain it in the mounted position.

U.S. Pat. No. 4,871,143, issued Oct. 3, 1989, to G. S. Baker, discloses a gate valve with a supplemental actuator having a connection to the actuator housing to exert an additional closing force on the stem.

U.S. Pat. Reissue No. 29,322, reissued Jul. 26, 1977, to N. A. Nelson, discloses a mechanism for remote actuation by a pressure medium such as hydraulic or pneumatic fluid. Mechanical or fluid actuated interlock means is provided to render fluid actuating means inoperative and is also provided with means for rendering the mechanical override inoperative.

A review of the above patents shows that there remains a need for a pneumatic actuator assembly that offers more dependable operation, faster maintenance, easier assembly and disassembly, all at reduced levels of capital investment. Those skilled in the art have long sought and will appreciate the present invention which addresses these and other problems.

SUMMARY OF THE INVENTION

The pneumatic actuator assembly of the present invention may be used with a gate valve having a bonnet and an operating stem. The actuator is designed so efficiently that it can be quickly assembled in only about fifteen minutes. This is because alignment features are built into the major construction components that effectively place the components in concentric alignment with each other. For example, once one threaded connector is aligned between the pneumatic cylinder and the lower cylinder flange, then the cylinder and lower flange are in radial alignment as well concentric alignment. Thus, assembly can proceed very quickly as compared to prior art devices. The actuator is also designed so that it can be broken apart at the most convenient joint for replacing seals. It is not necessary to open the gate valve bonnet when performing maintenance or assembly/disassembly of the actuator as required in prior art devices, thereby avoiding the need for a more costly reassembly of the gate valve.

In a presently preferred embodiment, the pneumatic actuator comprises a pneumatic cylinder with straight lateral sides defining therein a pneumatic chamber. The straight-sided pneumatic cylinder has first and second ends. The first end defines a plurality of first cylinder end fastener holes therein. The second end also defines a plurality of second cylinder end fastener holes therein. A piston is reciprocally moveable within the pneumatic cylinder for controlling the operating stem. A spring assembly biases the piston in a first position. A piston seal seals between the piston and the straight-sided pneumatic cylinder. A first cylinder plate has an edge with a stepped profile such that an inner cylinder is formed having an outer diameter that mates to an inner diameter of the straight-sided pneumatic cylinder for a slip fit therebetween. The first cylinder plate defines therein a plurality of first plate fastener holes for mating with respective of the plurality of first cylinder end fastener holes. A plate seal seals between the first cylinder plate and the straight-sided pneumatic cylinder. A second cylinder plate defines a plurality of second plate fastener holes that mate with the plurality of second cylinder end fastener holes. The second cylinder plate has an outer edge with a second plate stepped profile for receiving the second end of the pneumatic cylinder. The stepped profile of the first and second plates may form a right angle, or an angle that is substantially inclined enough for guidance purposes, for receipt of the accordingly shaped to fit cross-sectioned ends of the pneumatic cylinder.

A wear ring on the piston between the piston and the straight-sided pneumatic cylinder prevents metal-to-metal contact between the piston and the straight-sided pneumatic cylinder.

A cylindrical spring housing is provided that has a smaller diameter than the pneumatic cylinder. The cylindrical spring housing is secured adjacent to the pneumatic cylinder. The spring assembly extends within the cylindrical spring housing and the pneumatic cylinder. A stem driver secured to the piston and provides a slip joint for connection to the operating stem such that the stem driver is detachable from the operating stem. This feature avoids the need to open the bonnet of the gate valve for certain maintenance purposes. The pneumatic cylinder, in a preferred embodiment, has an outer diameter ranging from about 19 to 22 inches but could be made for other sizes if desired.

The gate valve bonnet has first and second end portions with the first end portion defining a pocket therein. The second end portion is in direct communication with the gate valve pressure. The operating stem extends through the pocket. The end portion of the bonnet is securable to the cylindrical spring housing. A packing is disposed in the pocket for sealing around the operating stem such that the gate valve pressure is sealed off at the first end of the bonnet, which when oriented as shown in the FIGURE, would be the top end of the bonnet. A plurality of bolt connections are provided between the bonnet and the spring housing for securing the spring housing to the bonnet. The packing is located so as to be directly accessible for maintenance when the spring housing is removed from the bonnet by simple removal of the plurality of bolt connections. A wear ring is mounted in the packing to prevent metal-to-metal contact with the operating stem. The wear ring is preferably positioned in the packing gland which is typically metallic and may be threadably mounted for adjusting the packing. One or more wear rings are preferably mounted in surrounding relationship to the stem driver/operating stem to prevent metal-to-metal contact as the stem driver/operating stem reciprocates.

The cylindrical spring housing is secured to the gate valve bonnet by threaded fasteners. Stop surfaces for the spring assembly are provided in the cylindrical spring housing and the pneumatic cylinder for maintaining the spring assembly in a compressed condition such that when a combination of the pneumatic cylinder and the cylindrical spring housing is removed from the gate valve bonnet, the spring assembly is contained within the pneumatic cylinder and the cylindrical spring housing in the compressed condition.

A maintenance method for the pneumatic actuator comprises removing threaded fasteners in an upper cylinder plate, removing the upper cylinder plate from a rectangular cross-sectioned upper end of a pneumatic cylinder to expose the piston, replacing a seal, and replacing the upper cylinder plate. Thus, the process for changing seals of the pneumatic pressure chamber are quite direct, thereby saving time. The piston is removed for replacing the piston seal between the piston and the pneumatic cylinder. The driving stem may be removed for replacing one or more seals around the driving stem. The piston may be removed for adjusting a stop to control a drift of the gate valve. The drift adjustment or stop is preferably adjusted by rotation. For maintenance of the operating stem packing, the method comprises removal of threaded fasteners between the bonnet and the spring housing, releasing a slip joint between a driving stem and the operating stem to separate the operating stem from the driving stem, and removal of the spring housing in combination with the pneumatic chamber for exposing the stem seal. The spring stops contain the spring assembly in a compressed position when the spring housing in combination with the pneumatic chamber is removed.

It is an object of the present invention to provide an improved pneumatic actuator assembly and method.

It is another object of the present invention to provide a pneumatic actuator assembly with components that are substantially concentrically self-aligning to aid in the assembly/disassembly of the actuator.

It is yet another object of the present invention to provide a pneumatic actuator assembly that can be conveniently opened in the most direct manner possible for maintenance of seals and packings without disturbing the gate valve or other seals and for reduced maintenance time.

It is yet another object of the present invention to prevent wear of the actuator moving components.

A feature of the present invention is stepped fitting connections between the upper and lower cylinder plates and the pneumatic cylinder.

Another feature of the present invention is a stem packing mounted to be readily maintained by removal of the spring housing from the bonnet without disturbing other seals.

Yet another feature of the present invention is the use of wear rings to prevent metal-to-metal contact between moving components.

An advantage of the present invention is a greatly reduced assembly time and manufacturing cost.

Another advantage of the present invention is significantly reduced maintenance costs.

Yet another advantage of the present invention is greater dependability of operation.

These and other objects, features, and advantages of the present invention will become apparent from the drawings, the descriptions given herein, and the appended claims.

BRIEF DESCRIPTION OF THE DRAWINGS

The FIGURE is an elevational view, partially in section, of a pneumatic actuator in accord with the present invention.

While the present invention will be described in connection with presently preferred embodiments, it will be understood that it is not intended that the invention is limited to those particular embodiments but the descriptions given herein merely are to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims be encompassed as a part of the present invention.

DETAILED DESCRIPTION OF THE PREFERRED EMBODIMENTS

Referring now to the drawing, and more particularly to the FIGURE, where the preferred embodiment of actuator 10, in accord with the present invention, is illustrated. Actuator 10 is designed for long life, minimal maintenance, and low cost manufacture. The advantages adhere to both the actuator and the corresponding gate valve. For example, the components are designed so they can be assembled at different times for flexible, cost saving manufacturing. Moreover, the present design that allows quick assembly/disassembly construction aids in both manufacture and repair.

Actuator 10 controls operating stem 12 to provide reciprocal movement thereof in response to pressurization/exhaust of pneumatic chamber 14. Movement of operating stem 12 responsively to pneumatic pressure controls flow of fluid through a valve, such as a gate valve. For example, contained within valve bonnet assembly 16, in the region of gate valve bonnet chamber 13, typically exists a pressurized fluid, such as a gas or liquid, required to be controlled by the gate valve in a pipe line or other installation.

To allow convenient and sturdy interconnection between what are typically associated with the actuator components and the components typically comprising the gate valve, bonnet assembly 16 is secured to spring housing 17, preferably by bolts such as mounted in through-bolt holes 18 in bonnet ring 20. Platform 21 on bonnet ring 20 is raised so that base 23 of spring housing 17 mounts for quick and easy center or concentric alignment of the two components with respect to each other. Once one through-bolt hole is aligned, then the remaining through bolt-holes 18 are also aligned. The alignment feature saves manufacturing time and cost as compared to other typical prior art construction methods such as snap rings, which can be quite difficult to effect. Bonnet ring 20 is secured or otherwise mounted to bonnet assembly circular or cylindrical hub 24 by connecting means such as set screws 22 or other means. Bonnet ring 20 is made to slide fit easily over bonnet circular/cylindrical hub 24 of bonnet assembly 16. It will be noted that bonnet ring 20 could be made larger or smaller without the need to change the bonnet size, or more particularly hub 24, thereby promoting interchangeableness of components.

Bonnet housing 25 provides a top cap for a gate valve in accordance with the present invention. An example of an exemplary gate valve is that shown in U.S. Pat. No. 4,878,651 assigned to Worldwide Oilfield Machine, Inc, sold under the trademark MAGNUM, and which is hereby incorporated herein by reference.

Pressurized fluid to be controlled by the gate valve may be present within bonnet enclosure 13. Within bonnet housing 25, a grease fitting is provided with check valve 26 for lubricating the gate valve including stem operating 12. Bleeder plug 28 is used in conjunction therewith.

At the top end of bonnet assembly 16, as indicated by the orientation of the FIGURE, packing assembly 31 is positioned where it is readily available for replacement/maintenance without the need to remove bonnet housing 25 from the valve body. The avoidance of the need to remove bonnet housing 25 from the valve body is an excellent feature of the present invention because removal of bonnet housing 25 from the valve body is time consuming and requires changing out numerous seals, including metal seals that are better left alone when functioning properly. Therefore, placement of packing assembly 31 at the top of bonnet assembly 16 is quite advantageous for low cost maintenance.

Packing assembly 31 includes sealing components including seal 33 and packing gland 35. Packing assembly 31 seals around operating stem 12 for sealing bonnet cavity 13 to control fluids that may be under pressure therein. Packing gland 35 may be threadably mounted for adjustment of the packing and is typically of metallic construction. Wear ring 37 within packing gland 35 supports operating stem 12 to avoid any metal-to-metal contact that causes friction, wear, galling, and so forth to thereby extend the operating life. The avoidance of wear on the sealing portion of operating stem 12, that reciprocates during operation of the valve through packing assembly 31, helps maintain and therefore improves the seal life and reliability provided by packing assembly 31.

Spring housing 17, disposed in a lower portion of actuator 10, is selected to be large enough to accommodate a suitable diameter return spring 30. To save manufacturing material and time costs, spring housing diameter 17 has a diameter considerably smaller than that of pneumatic cylinder 32. The stroke of the actuator does not require the larger diameter cylinder throughout the length of piston 44 movement as is normally provided with prior art devices. The present invention avoids the waste of space and materials of such an extended pneumatic cylinder 32. Spring housing 17 of the present invention preferably incorporates shoulder 34 for supporting lower cylinder plate 36 in a convenient manner that allows quick assembly of spring housing 17 and lower cylinder plate 36. The inner diameter of lower cylinder plate as indicated at 39 and outer diameter 38 of spring housing 17 are preferably selected for a slip fit connection. Thus, lower cylinder plate inner and spring housing outer are designed for quick concentric alignment with respect to each other and, therefore, quick and easy assembly of this portion of actuator 10. Spring housing 17 may then be secured, such as by welding. If desired or required by customer specifications, the diameter of spring housing 17 could be increased to accommodate a larger spring without the need to change dimensions on all major components. Only lower cylinder plate 36 and bonnet ring 20 need be changed for such a modification. This is another example of how the components of the present invention may be interchanged to produce a model with different specifications, but without the extensive cost of a complete new design with new all new parts.

Lower cylinder plate 36 includes recess guide 40 so that the relatively heavy pneumatic cylinder 32 can be quickly securely positioned and centralized on lower cylinder plate 36. Step 40 preferably is formed at a right angle or close thereto, that may preferably be a chamfered right angle, to thereby mate with the right angle on the end of cylinder 32 at lower shoulder 63. At a minimum, the angle of step 40 is relatively steep and is preferably greater than about 30° to 45°. For ease of manufacturing and for providing sufficient metallic strength surrounding cap screw holes 42 without adding additional thickness to pneumatic cylinder 32, lower shoulder 63 of cylinder 32 is made a right angle, that may be chamfered, but could also be sloping somewhat if desired. Lower shoulder 63 (and upper shoulder 65) preferably has a substantially rectangular cross-section as shown in the FIGURE. The concept is to provide a guide that guides the heavy cylinder 32 onto lower cylinder plate 36 to centralize the components with respect to each other and without likelihood of slipping such that the heavy cylinder slips off of the lower cylinder plate. Platform or cylinder portion 41 is raised with respect to step 40 and has an outer diameter that is a slip fit size with respect to the inner diameter of cylinder 32. The pneumatic cylinder is easily guided into concentric alignment. Thus, guide or step 40 saves considerable manufacturing assembly time.

Once one cap screw hole 42 is aligned between lower cylinder plate 36 and pneumatic cylinder 32, the remaining cap screw holes are also effectively aligned. Thus, alignment of the two components is very quick and easy as compared to snap rings, split rings, and other prior art designs wherein the cylinder and base can easily move with respect to each other. In prior art actuators, the cylinder can fall and be damaged or even create a safety hazard. Cap screw holes 42 are formed in the bottom end (and top end) of cylinder 32 such that they have their central axis parallel with the lateral wall of cylinder 32. Cylinder 32 is preferably a straight cylinder. This simple design requires no special additional machining except for drilling cap screw holes 42. Drilling of cap screws 42 is a relatively straight forward and quick manufacturing process. As well, the required machining of lower cylinder plate 36 is not extensive and results in the easy alignment of the present invention that speeds assembly time. As a general rule, those workmen who work with pneumatic actuators are very pleased to work with the actuator of the present invention because it is comparatively much easier to assemble than prior art actuators.

Appropriate mating cap screw holes 42 are drilled through lower cylinder plate 36 for mating with pneumatic cylinder 32. Vent hole 43 is provided for venting air during operation of pneumatic actuator 10. The utilitarian and yet simplistic design of the present invention makes the assembly of the actuator very quick. For mentioned above, an actuator of the present design may be assembled in about fifteen minutes. It will also be readily visible to those skilled in the art from a review of the FIGURE, that the slip fit design of the present invention provides a very sturdy.

The length of pneumatic cylinder 32 is preferably limited in the presently preferred design to be only slightly longer than the length of the stroke of piston 44 within pneumatic cylinder 32. The limitation of the length of pneumatic cylinder to the stroke reduces the material, machining, and cost of the actuator. Also, as discussed above, many of the same components can be used to provide an actuator with a different piston stroke such as for operation with a gate valve for larger diameter pipe. Due to the limitation of the length of the cylinder to the stroke length, the larger diameter cylinder can be supplied at favorable material cost compared to prior art actuators and is very much more convenient to use due to the almost guaranteed compatibility with operating pressure available at the particular location of use. In some cases, it is difficult for a customer to even determine if a prior art actuator will even be available for a particular pipe size and operating pressure. Furthermore, the customer will not always know exactly what operating pressures will necessarily be available. Thus, the diameter of pneumatic cylinder of the present invention is selected so that the minimum air supply available at operation sites can easily activate piston 44. Actuator 10 is always sized for the air supply and no additional models, with associated additional model costs and difficulties, are required. This selection of the diameter of the pneumatic cylinder saves manufacturing costs and increases flexibility of part interchangeableness. The diameter of cylinder 32 is preferably greater than about 20 inches and, in one presently preferred embodiment is about 20.63 inches. However, a reasonable range for a diameter might be from about 18 to 22 inches for reliable operation with a wide fluctuation of different actuating pressures available. The presently preferred diameter of piston 44 is greater than about 17 inches and is in the range 18 inches in diameter. Of course the present design may be made smaller as requested by clients for use when available pressures are known to be sufficient for operation.

Piston 44, like all moving parts in the preferred embodiment of the present invention, floats on a wear ring, such as wear ring 46. Wear rings are comprised of durable, low-friction, non-metallic material. Therefore, metal-to-metal contact is avoided to prevent friction, galling, and other wear. For this reason, lower maintenance and longer actuator life are typical for the present invention as compared to prior art actuators.

Piston seal 48, upper cylinder plate seal 50 around upper cylinder plate 52, and seals 54 and 56 on driving stem 58 are used to seal pneumatic pressure for operation. Piston 44 is mounted to driving stem mounting portion 60 by retainer ring 62. Driving stem 60 separates from operating stem 12 at slip joint 66 to allow additional flexibility of assembly or disassembly, as desired. Thus, actuator 10 can be disassembled and assembled between spring housing 17 and bonnet ring 20 to quickly change out packing assembly 31. Thus, unlike many prior art actuators, packing assembly 31 is directly accessible by simply unbolting fasteners of fastener holes 18 and removing spring housing 17 from bonnet ring 20. Actuator 10 can also be disassembled and assembled at upper cylinder plate 52 for quickly changing out one of the upper seals as briefly listed previously such as the piston seal, stem seals, or upper plate seal.

Upper cylinder plate 52 also includes a guide or step 64 that allows immediate alignment with pneumatic cylinder 32. Shoulder 65 has an outer diameter that slip fits or mates to the inner diameter of pneumatic cylinder 32 and preferably is formed with a right angled profile to match the right angle profile of the upper end of pneumatic cylinder 32. Step 64 allows for very quick assembly of relatively heavy components due to the very easy alignment. While a sloping angle could also be used, a relatively steep angle is desirable, such as at least greater than about 45°. Cap screw holes 67 drilled in the top end of cylinder 32 and upper cylinder plate 52 are all aligned when one screw hole 67 is aligned. Cylinder 32 may therefore have a simple rectangular cross-section that is relatively easy to manufacture.

The present invention is designed such that engagement of upper surface 68 of pneumatic cylinder 44 with lower surface 70 of upper cylinder plate 52 forms a stop for movement of operating stem 12 and the valve gate. Thus, the gate does not get out of alignment due to repeated engagement providing for move accurate and longer lasting service.

Stem protector/position indicator 72 is preferably threadably connected to neck portion 74 of upper cylinder plate 52. Wiper ring 76 is preferably provided in neck portion 74 for driving stem 58 along with wear ring 78 that prevents metal-to-metal contact. Another wear ring or set of wear rings 80 is provided to support operating stem so as to avoid metal-to-metal contact. As discussed previously, relatively moving components of the present invention are mounted by wear rings to reduce friction, galling, and contact problems. A relief valve may be provided at passage 82 and a pneumatic control line may be connected to pneumatic pressure passageway 84.

Spring cartridge assembly 86 is comprised of upper cylinder 88 and telescoping mounted lower cylinder 90 with stops provided therein as shown for limiting the maximum stroke length of the spring cartridge. Since the maximum opening length or stroke length of the spring cartridge is limited, the spring can be preloaded and is generally under tension of a few thousand pounds, such as about two thousand pounds. The preloaded spring cartridge can simply be installed into spring housing 17. Other fail-safe designs without a spring cartridge would require the return spring to be tensioned during assembly of the actuator making assembly and disassembly difficult. Preloading is necessary so that the spring has sufficient force to provide the necessary fail-safe operation. Spring cartridge upper flange 92 engages piston 44 and spring cartridge lower flange 94 rests on internally extended base 23 of spring housing 17. Thus, the spring is contained in a compressed position when the actuator is removed from bonnet ring 20. Piston stop 96 is also used as a drift adjustment and is preferably adjustably secured, such as by threaded connection, to an upper portion of spring housing 96. Once the drift is adjusted, then it can be locked into position such as with a set screw as through the screw hole shown on the flange portion piston stop 96. The drift adjustment provides for an exact piston stroke to precisely control the gate valve.

Due to the unique manufacture of the present invention, the various component can be made at desired time during the manufacturing cycle and assembled at a later time. It is not necessary that certain components be built in a specific sequence. For instance, the actuator and valve are completely separate and can be assembled together or, in fact, the actuator of the present invention can be made to operate different types of gate valves. This flexibility greatly decreases manufacturing costs since the time frame for building the actuator does not have to be a specific sequence that could be interrupted due to various conditions. Due to the construction of the components, the central axis 98 of each of the lower cylinder plate, the pneumatic cylinder, and the upper cylinder plate are automatically aligned due to the step construction that allows for quick assembly. The present invention provides a rugged construction that firmly fixes all components such as the operating stem, spring cartridge, spring housing, and so forth in alignment with central axis 98.

In operation, pneumatic pressure is applied to piston 44 that moves downwardly in cylinder 32 for a stroke determined by the length of cylinder 32 and drift adjustment 96. The downward force is greater than forces acting upwardly on operating stem 12 due to line pressure. Actuator 10 is preferably used for fail-safe operation so that should a control pneumatic pressure, such as a pressure gas supply in a gas line drops below a selected amount, then the valve actuator will be released and the valve placed in the desired fail close position. In closing, spring 30 is selected to provide sufficient strength to overcome gate friction and move piston 44 into engagement with upper cylinder flange 52. Movement of piston 44 downwardly moves driving stem 58 and operating stem downwardly. Spring pressure and, if present, line pressure act on operating stem 12 to move piston 44 upwardly when pneumatic pressure is removed. However, if the line pressure is zero then the spring pressure must be sufficient for moving piston 44 upwardly to the top of the valve stroke.

The foregoing disclosure and description of the invention is illustrative and explanatory thereof, and it will appreciated by those skilled in the art, that various changes in the size, shape and materials as well as in the details of the illustrated construction or combinations of features of the various actuator elements may be made without departing from the spirit of the invention.

What is claimed is:

1. A pneumatic actuator for a gate valve, said gate valve having an operating stem, said pneumatic actuator comprising:
    a pneumatic cylinder defining therein a pneumatic chamber, said pneumatic cylinder having first and second ends, said first end defining a plurality of first cylinder end fastener holes therein;
    a piston reciprocally moveable within said pneumatic cylinder for controlling said operating stem;
    a spring assembly to bias said piston in a first position;
    a piston seal for sealing between said piston and said pneumatic cylinder;
    a first cylinder plate having an edge with a guide ridge profile such that an inner cylinder is formed having an outer diameter that mates to an inner diameter of said first end of said pneumatic cylinder for a slip fit therebetween, said first cylinder plate defining therein a plurality of first plate fastener holes for mating with respective of said plurality of first cylinder end fastener holes;
    said second end of said pneumatic cylinder defining a plurality of second cylinder end fastener holes therein;
    a second cylinder plate defining a plurality of second plate fastener holes for mating with said plurality of second cylinder end fastener holes; and
    a plate seal for sealing between said first cylinder plate and said pneumatic cylinder.

2. The pneumatic actuator of claim 1, further comprising:
    said second cylinder plate having an outer edge with a second plate stepped profile for receiving said second end of said pneumatic cylinder.

3. The pneumatic actuator of claim 1, wherein at least one of said first and second ends of said pneumatic cylinder have a substantially rectangular cross-section.

4. The pneumatic actuator of claim 1, wherein said pneumatic cylinder further comprises:
    a round cylinder with a cross-section having a straight inner side and a straight outer side.

5. The pneumatic actuator of claim 1, further comprising:
    a cylindrical spring housing having a smaller diameter than said pneumatic cylinder and being secured adjacent to said pneumatic cylinder, said spring assembly having a telescoping portion with a maximum stroke and being preloaded at said maximum stroke, said spring housing extending within said cylindrical spring housing and said pneumatic cylinder.

6. The pneumatic actuator of claim 1, further comprising:
    a stem driver securable to said piston, said stem driver having a slip joint for connection to said operating stem such that said stem driver is detachable from said operating stem.

7. The pneumatic actuator of claim 1, further comprising:
    said pneumatic cylinder having an outer diameter ranging from about 19 to 22 inches.

8. A pneumatic actuator for a gate valve, said gate valve having an operating stem, said gate valve being operable for controlling a fluid pressure, said pneumatic actuator comprising:
    a pneumatic cylinder defining therein a pneumatic chamber, said pneumatic cylinder having first and second ends;
    a piston reciprocally moveable within said pneumatic cylinder;
    a stem driver securable to said piston, said stem driver having a slip joint for connection to said operating stem such that said stem driver is detachable from said operating stem;
    a spring assembly to bias said piston in a first position, said spring assembly being mounted in surrounding relationship to said slip joint;
    a piston seal for sealing between said piston and said pneumatic cylinder;
    a first cylinder plate for said first end of said pneumatic cylinder;
    a second cylinder plate for said second end of said pneumatic cylinder;
    a cylindrical spring housing having a smaller diameter than said pneumatic cylinder and being secured adjacent to said pneumatic cylinder, said spring assembly extending within said cylindrical spring housing and said pneumatic cylinder.

9. The pneumatic actuator of claim 8, further comprising:
    a bonnet having first and second end portions, said first end portion defining a pocket therein, said second end portion being in direct communication with said pressure, said operating stem extending through said pocket, said end portion of said bonnet being securable to said cylindrical spring housing, and
    a packing disposed in said pocket for sealing around said operating stem such that said pressure is sealed off at said first end of said bonnet.

10. The pneumatic actuator of claim 9, further comprising:
 a plurality of bolt connections between said bonnet and said spring housing for securing said spring housing to said bonnet.

11. The pneumatic actuator of claim 10, wherein:
 said packing is located so as to be directly accessible when said spring housing is removed from said bonnet by removal of said plurality of bolt connections.

12. The pneumatic actuator of claim 8, further comprising:
 a packing assembly for sealing around said operating stem, and
 a wear ring mounted in said packing to prevent metal-to-metal contact with said operating stem.

13. The pneumatic actuator of claim 8, further comprising:
 said first cylinder plate having a stepped profile such that an inner cylinder is formed on said first cylinder plate having an outer diameter that mates to an inner diameter of said pneumatic cylinder for a slip fit therebetween.

14. The pneumatic actuator of claim 8, further comprising:
 a bonnet ring separable from said bonnet, said bonnet ring defining said plurality of bolt connections therein.

15. The pneumatic actuator of claim 8, further comprising:
 said pneumatic cylinder having an outer diameter ranging from about 19 to 22 inches.

16. A pneumatic actuator for a gate valve, said gate valve being operable for controlling a fluid pressure contained within a gate valve bonnet, said gate valve having an operating stem, said pneumatic actuator comprising:
 a pneumatic cylinder defining therein a pneumatic chamber, said pneumatic cylinder having first and second ends;
 a piston reciprocally moveable within said pneumatic cylinder;
 a wear ring mounted on said piston for supporting said piston with respect to said cylinder to prevent metal-to-metal contact between said pneumatic cylinder and said piston;
 a stem driver securable to said piston, said stem driver having a slip joint for connection to said operating stem such that said stem driver is detachable from said operating stem;
 a spring assembly to bias said piston in a first position, said spring assembly being mounted in surrounding relationship to said slip joint;
 a piston seal for sealing between said piston and said pneumatic cylinder;
 a first cylinder plate for said first end of said pneumatic cylinder;
 a second cylinder plate for said second end of said pneumatic cylinder; and
 one or more wear rings mounted in surrounding relationship to said stem driver to prevent metal-to-metal contact as said stem driver reciprocates.

17. The pneumatic actuator of claim 16, further comprising:
 a cylindrical spring housing having a smaller diameter than said pneumatic cylinder and being secured adjacent to said pneumatic cylinder, said spring assembly extending within said cylindrical spring housing and said pneumatic cylinder.

18. The pneumatic actuator of claim 16, wherein:
 said first cylinder plate is removably fastened to said pneumatic cylinder by threaded fasteners, and
 said second cylinder plate is removably fastened to said pneumatic cylinder by threaded fasteners.

19. The pneumatic actuator of claim 16, wherein:
 a cylindrical spring housing having a smaller diameter than said pneumatic cylinder and being secured adjacent to said second cylinder plate, said spring assembly extending within said cylindrical spring housing and said pneumatic cylinder, and
 said cylindrical spring housing being secured to said gate valve bonnet by threaded fasteners.

20. The pneumatic actuator of claim 19, further comprising:
 stop surfaces for said spring assembly in said cylindrical spring housing and said pneumatic cylinder for maintaining said spring assembly in a compressed condition such that when a combination of said pneumatic cylinder and said cylindrical spring housing is removed from said gate valve bonnet, said spring assembly is contained within said pneumatic cylinder and said cylindrical spring housing in said compressed condition.

21. The pneumatic actuator of claim 16, further comprising:
 a packing assembly for sealing around said operating stem, said packing assembly containing therein at least one wear ring to supporting said operating stem for reciprocal movement without metal-to-metal contact.

22. The pneumatic actuator of claim 16, further comprising:
 a stop surface on said first cylinder plate, and
 a stop surface on said piston to provide a stop for a stroke length of said piston.

23. A pneumatic actuator for a gate valve, said gate valve having an operating stem, said pneumatic actuator comprising:
 a pneumatic cylinder defining therein a pneumatic chamber, said pneumatic cylinder having first and second ends;
 a piston reciprocally moveable within said pneumatic cylinder for controlling said operating stem;
 a spring assembly to bias said piston in a first position, said spring assembly including relatively moveable members, said relatively moveable members being moveable to a maximum length, a spring for engaging said relatively moveable members such that said spring having preloaded tension when relatively moveable members are at said maximum length;
 a piston seal for sealing between said piston and said pneumatic cylinder;
 a first cylinder plate having an edge with a guide profile for guiding said first end of said pneumatic cylinder onto said first cylinder plate during assembly for a slip fit therebetween.

24. The pneumatic actuator of claim 23, further comprising:
 a threaded drift adjustment ring with an aperture therethrough, said spring assembly fitting within said threaded drift adjustment ring.

25. The pneumatic actuator of claim 24, further comprising:

a surface of said piston being engageable with said threaded drift adjustment ring to provide a stop surface that defines a stroke length end for said piston.

26. The pneumatic actuator of claim 23, further comprising:

a slip joint connection between said piston and said operating stem, said slip joint being positioned within said spring assembly.

27. The pneumatic actuator of claim 23, further comprising:

an operating stem seal positioned internally of said spring assembly and in communication with said spring assembly, said operating stem seal being accessible for maintenance when said spring assembly is removed from said pneumatic actuator.

* * * * *